US010781967B1

(12) United States Patent
DeCosta

(10) Patent No.: US 10,781,967 B1
(45) Date of Patent: Sep. 22, 2020

(54) WALL ANCHORING SYSTEM WITH CABLE PASS THROUGH

(71) Applicant: Thomas DeCosta, Westport, MA (US)

(72) Inventor: Thomas DeCosta, Westport, MA (US)

(*) Notice: Subject to any disclaimer, the term of this patent is extended or adjusted under 35 U.S.C. 154(b) by 0 days.

(21) Appl. No.: 16/531,031

(22) Filed: Aug. 3, 2019

Related U.S. Application Data

(63) Continuation-in-part of application No. 15/460,114, filed on Mar. 15, 2017, now abandoned.

(51) Int. Cl.
| F16M 13/02 | (2006.01) |
| F16L 5/00 | (2006.01) |
| H02G 3/12 | (2006.01) |
| F16B 13/08 | (2006.01) |

(52) U.S. Cl.
CPC .............. F16M 13/02 (2013.01); F16L 5/00 (2013.01); H02G 3/123 (2013.01); F16B 13/0808 (2013.01)

(58) Field of Classification Search
CPC .. F16B 13/0808; F16B 13/0833; F16B 13/04; F16B 13/045; F16B 13/08; F16B 13/0825; F16B 13/0866; F16B 2013/10; F16B 2013/105; H02G 3/123; H02G 3/22; H02G 3/083; H02G 3/121; F16L 5/00; F16M 13/02
USPC ... 174/58, 480, 481, 60, 503, 502, 135, 535, 174/659, 67; 248/27.1, 906, 56, 231.91, 248/231.9; 52/220.8; 411/80.1, 344, 411/340, 345, 21; 220/3.6
See application file for complete search history.

(56) References Cited

U.S. PATENT DOCUMENTS

| 2,297,862 | A | * | 10/1942 | Bachmann | H02G 3/123 220/3.6 |
| 2,891,102 | A | * | 6/1959 | Grimes | H01R 13/447 174/67 |
| 3,633,782 | A | * | 1/1972 | Bellinger | H02G 3/123 220/3.5 |
| 4,408,696 | A | * | 10/1983 | Crosson | H02G 3/123 174/58 |
| 6,102,360 | A | * | 8/2000 | Clegg | H02G 3/14 174/55 |
| 6,346,674 | B1 | * | 2/2002 | Gretz | H02G 3/123 174/481 |
| 7,078,618 | B2 | * | 7/2006 | Dinh | H02G 3/123 174/481 |
| 7,300,025 | B2 | * | 11/2007 | Korcz | H02G 3/123 220/3.9 |
| 7,557,308 | B2 | * | 7/2009 | Dinh | H02G 3/123 174/480 |
| 7,667,145 | B2 | * | 2/2010 | Dinh | H02G 3/14 174/480 |
| 7,759,576 | B1 | * | 7/2010 | Gretz | H02G 3/123 174/58 |

(Continued)

*Primary Examiner* — Ingrid M Weinhold

(57) ABSTRACT

A rapid mount wall anchoring system and cable pass through for securing devices to a wall and routing device cables through a wall. The wall anchoring system includes a rigid frame with mounting fasteners for securing the frame to a wall and can be easily maneuvered between obstructions that may exist at the mounting location due to its "blade like" guide members and cross brace. The frame includes an opening for fitment of either a load bearing plate for securing objects to a wall or a grommet when only cable pass through is desired.

8 Claims, 9 Drawing Sheets

(56) References Cited

U.S. PATENT DOCUMENTS

| | | | | |
|---|---|---|---|---|
| 7,897,870 | B1* | 3/2011 | Gretz | H02G 3/14 |
| | | | | 174/135 |
| 8,044,300 | B1* | 10/2011 | Gretz | H02G 3/123 |
| | | | | 174/57 |
| 8,063,302 | B1* | 11/2011 | Gretz | H02G 3/123 |
| | | | | 174/480 |
| 8,148,634 | B1* | 4/2012 | Gretz | H02G 3/123 |
| | | | | 174/50 |
| 8,324,516 | B1* | 12/2012 | Gretz | H02G 3/083 |
| | | | | 174/650 |
| 8,445,779 | B1* | 5/2013 | Gretz | H02G 3/123 |
| | | | | 174/480 |
| 8,581,098 | B2* | 11/2013 | Von Gal | H02G 3/123 |
| | | | | 174/481 |
| 8,975,518 | B1* | 3/2015 | Gretz | H02G 3/086 |
| | | | | 174/50 |
| 9,611,879 | B2* | 4/2017 | DeCosta | F16B 13/0833 |
| 2006/0021778 | A1* | 2/2006 | Fields | H02G 3/123 |
| | | | | 174/58 |
| 2011/0056743 | A1* | 3/2011 | Solan | H02G 3/123 |
| | | | | 174/502 |
| 2014/0341673 | A1* | 11/2014 | DeCosta | F16B 13/0833 |
| | | | | 411/80.1 |
| 2017/0227037 | A1* | 8/2017 | DeCosta | F16B 13/0833 |
| 2017/0356480 | A1* | 12/2017 | DeCosta | F16B 13/0808 |

* cited by examiner

WALL ANCHORING SYSTEM WITH CABLE PASS THROUGH

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 61/855,370 entitled "Grommet Assembly for Wall Panels", naming Thomas DeCosta as inventor, filed May 14, 2013, U.S. provisional patent application 61/956,528 entitled "Grommet Assembly for Wall Panels", naming Thomas DeCosta as inventor, filed Jun. 10, 2013, U.S. provisional patent application 61/960,817 entitled "Grommet Assembly for Wall Panels", naming Thomas DeCosta as inventor, filed Sep. 28, 2013, U.S. provisional patent application 61/962,115 entitled "Grommet Assembly for Wall Panels", naming Thomas DeCosta as inventor, filed Oct. 31, 2013, and U.S. utility patent application Ser. No. 14/120,287, entitled "Rapid Mount Wall Anchoring System With Cable Pass Through," naming Thomas DeCosta as inventor, filed May 14, 2014, and is a Continuation-In-Part of U.S. utility patent application Ser. No. 15/460,114, entitled "Rapid Mount Wall Anchoring System With Cable Pass Through," naming Thomas DeCosta as inventor, filed Mar. 15, 2017.

1. FIELD OF USE

The invention generally relates to a rapid mount anchoring system that can be used for either mounting of electrical devices on walls and in buildings or for cable pass through, the anchoring system hardware hidden behind the wall providing an aesthetically pleasing appearance at the wall area.

2. DESCRIPTION OF PRIOR ART (BACKGROUND)

Grommets have been used in interior space divider panel systems and standard walls for granting access through a wall to provide computer cables, data connection modules, electrical wires, plug outlets, jacks, and the like, to workstations or other locations/equipments.

For example, in numerous office environments, a multi-wall arrangement divides a space into individual, personal workstations that often require numerous electrical conduits, receptacles, computer connectors and telephone lines to be within easy reach at each of often differently configured work areas.

Grommet assemblies for the routing of cables are known in the art. For example, U.S. Pat. No. 8,357,853 is a rapid mount electrical cable entry device with a flexible slotted insert for routing low voltage cables through walls. The cable entry device includes a rigid low voltage frame with a plate having an opening therein, a rearward extending sidewall surrounding the opening, and a flexible insert within the opening. The flexible insert is removable to provide access to mounting fasteners on the inner periphery of the plate opening. All that is required for preparing the wall for installation of the cable entry device is a simple circular hole, which can be rapidly made in the sheet rock by a simple hole saw.

It would greatly improve these wall systems to incorporate an integrated system that allows for the rapid mounting of an electrical devices (Speakers, cameras, televisions) in addition to cable routing. Such a device should be an assembly having an angular footprint that allows for both the securement and structural support bracing of the mounting system to be installed between tight obstructions that may exist behind a wall.

A field installed rapid mount wall anchoring system usable in horizontal ceilings and vertical walls for the mounting of structures, including electrical devices, having the capability to support the weight of such structures, and allow cable pass through and strain relief protection would be desirable.

SUMMARY OF THE INVENTION

The invention is a rapid mount wall anchoring system and cable pass through for securing devices to a wall and routing device cables through the wall. The wall anchoring system includes a rigid frame with a lip having an opening therein, a rearward extending sidewall surrounding the opening, and rearwardly extending guide members extending rearward from the sidewalls to a cross brace. The guide members include integrated threaded fasteners that engage clamp arms that secure the device to a wall. The guide members and cross brace have a narrow width and defined arc range along the circular sidewall allowing this blade like structure to be easily maneuvered between obstructions that may exist at the mounting location. A rigid mounting plate is snap fit into the opening and includes a center positioned threaded bore.

The rigid mounting plate is removable to provide access to mounting fasteners integral to the guide members and positioned on the inner periphery of the plate opening. All that is required for preparing the wall for installation of the wall anchoring system is a simple circular hole, which can be rapidly made in the sheet rock by a simple hole saw. To secure the rigid frame to the wall, the mounting fasteners with attached clamp arms on the frame, and the guide members are passed through the hole in the wall and the clamp arms are rotated to draw the clamp arms against the interior wall mounting surface forcing the frame lip against the exterior wall for a secure fit.

After the frame is secured to the wall, the rigid plate insert is reinserted within the plate opening and thus provides a load bearing support for devices mounted on the plate. A cable pass through hole allows for the passage of cables from the mounted device through the wall. The center positioned threaded bore of the rigid plate is in alignment with a second threaded bore further rearward of the plate. The second threaded bore is formed within a cross member, the cross member rigidly connecting and supporting the guide members at their distal ends. The first and second threaded bores accept a fastening screw for securement of a device to the plate, and allows for the load of the attached device to be distributed throughout the rapid mount anchoring system. Alternatively, a grommet could be placed within the opening where the plate is only used as a wire pass through.

Several advantages are achieved with the rapid mount wall anchoring system of the present invention, including: (1) The wall anchoring system provides a support base for mounting electrical devices and structures to a wall (2) The wall anchoring system can be secured to a wall in less than a minute as wall preparation requires only a standard size hole saw. (3) The wall anchoring system can accommodate ¼-inch to 1.5-inch wall thicknesses (4) The wall device system can safely secure weights of up to 90 lbs (5) and the wall anchoring device, can be easily maneuvered between obstructions that may exist at the mounting location due to its "blade like" guide members and cross brace.

The cable entry device can be used to provide an aesthetically pleasing cable entry port on any wall.

These and other objects and advantages of the present invention will be better understood by reading the following description along with reference to the drawings.

BRIEF DESCRIPTION OF THE DRAWINGS

The foregoing and other objects, features, and advantages of the invention are apparent from the following detailed description taken in conjunction with the accompanying drawings in which.

DETAILED DESCRIPTION

In the following description, the same numerical references refer to similar elements. The embodiments, geometrical configurations, materials mentioned and/or dimensions shown in the figures or described in the present description are preferred embodiments only, given for exemplification purposes only.

Figure 4:
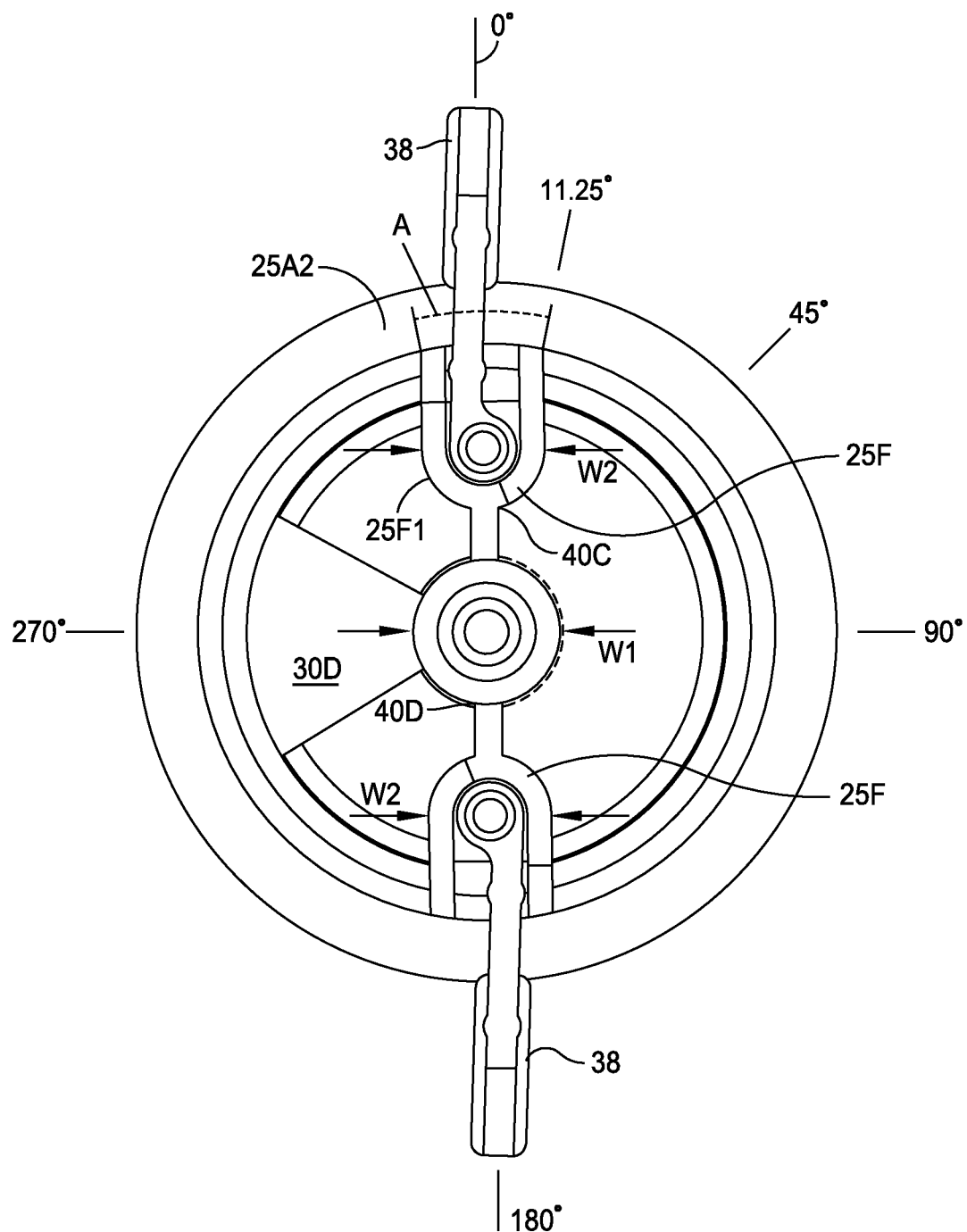
FIG. 4 is a top rear view of the rapid mount wall anchoring system illustrating the narrow dimensions of guide members and cross brace FIG. 1.
Figure 5:
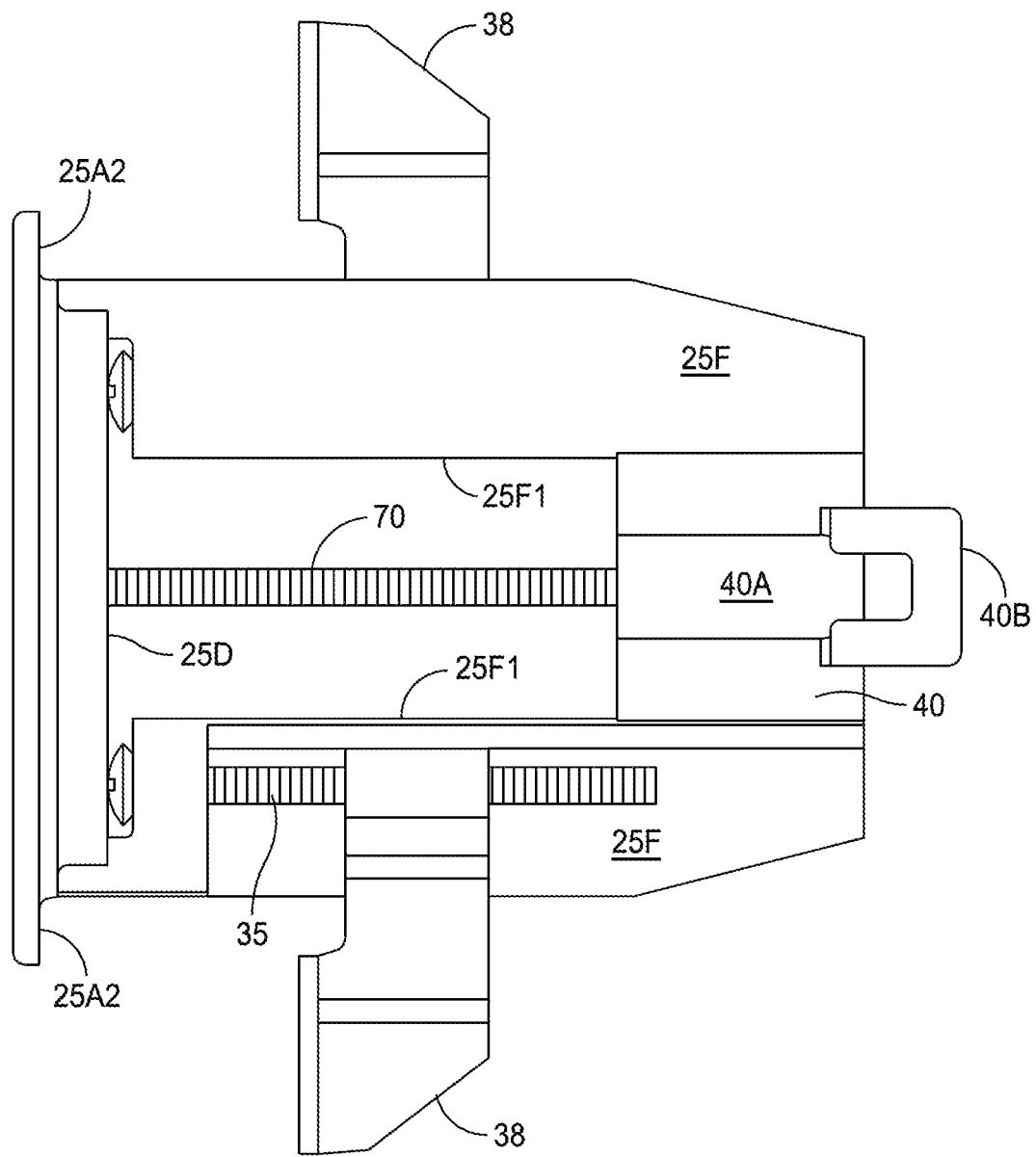
FIG. 5 is a left side view of the rapid mount wall anchoring system of FIG. 1.
Figure 6:
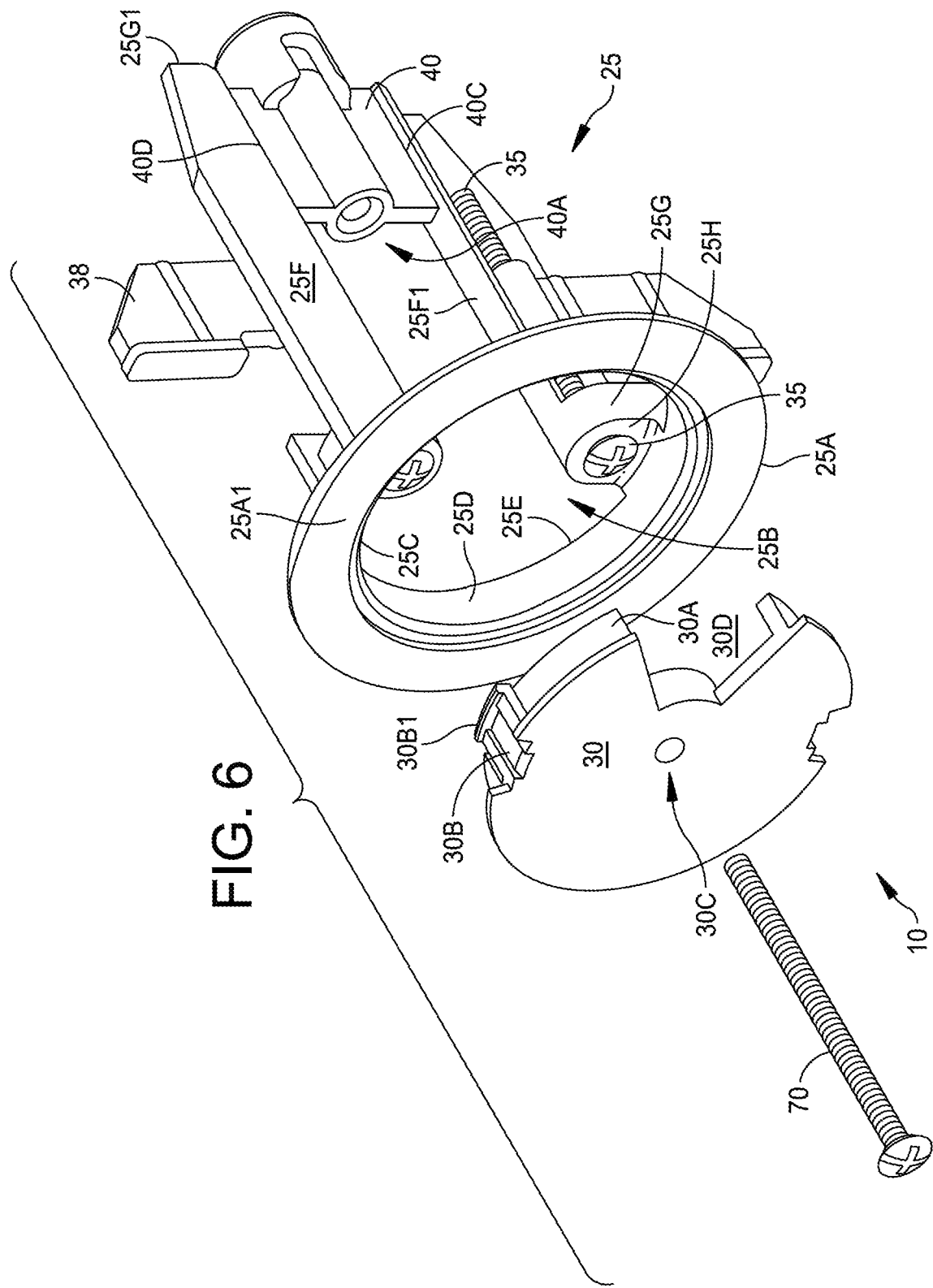
FIG. 6 is an exploded perspective view of the rapid mount wall anchoring system of FIG. 1, showing the mounting plate and fastening screw separated from the rigid frame.
Figure 7:
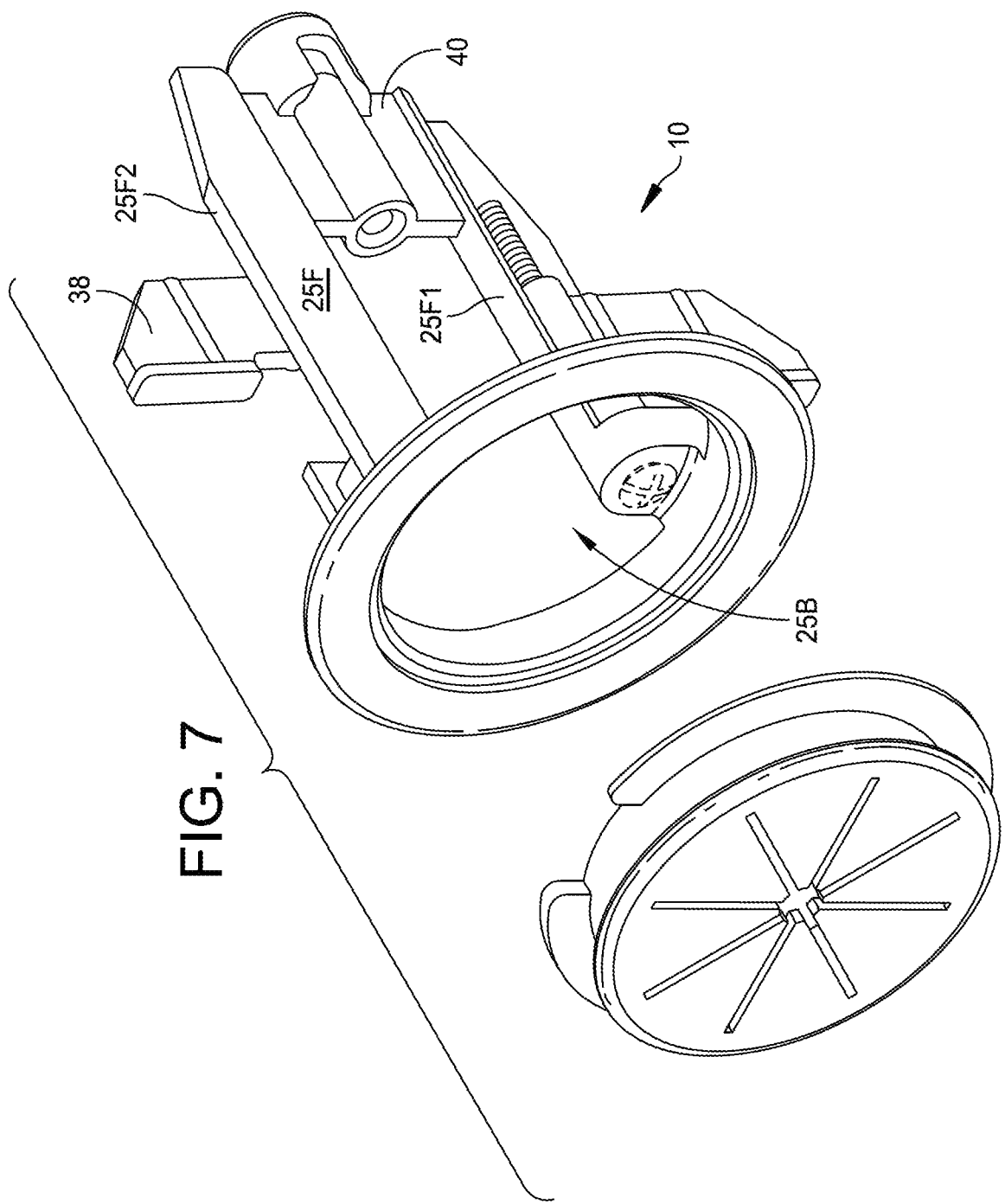
FIG. 7, 8 illustrates the rapid mount wall anchoring system of FIG. 1, having a grommet insert.
Figure 8:
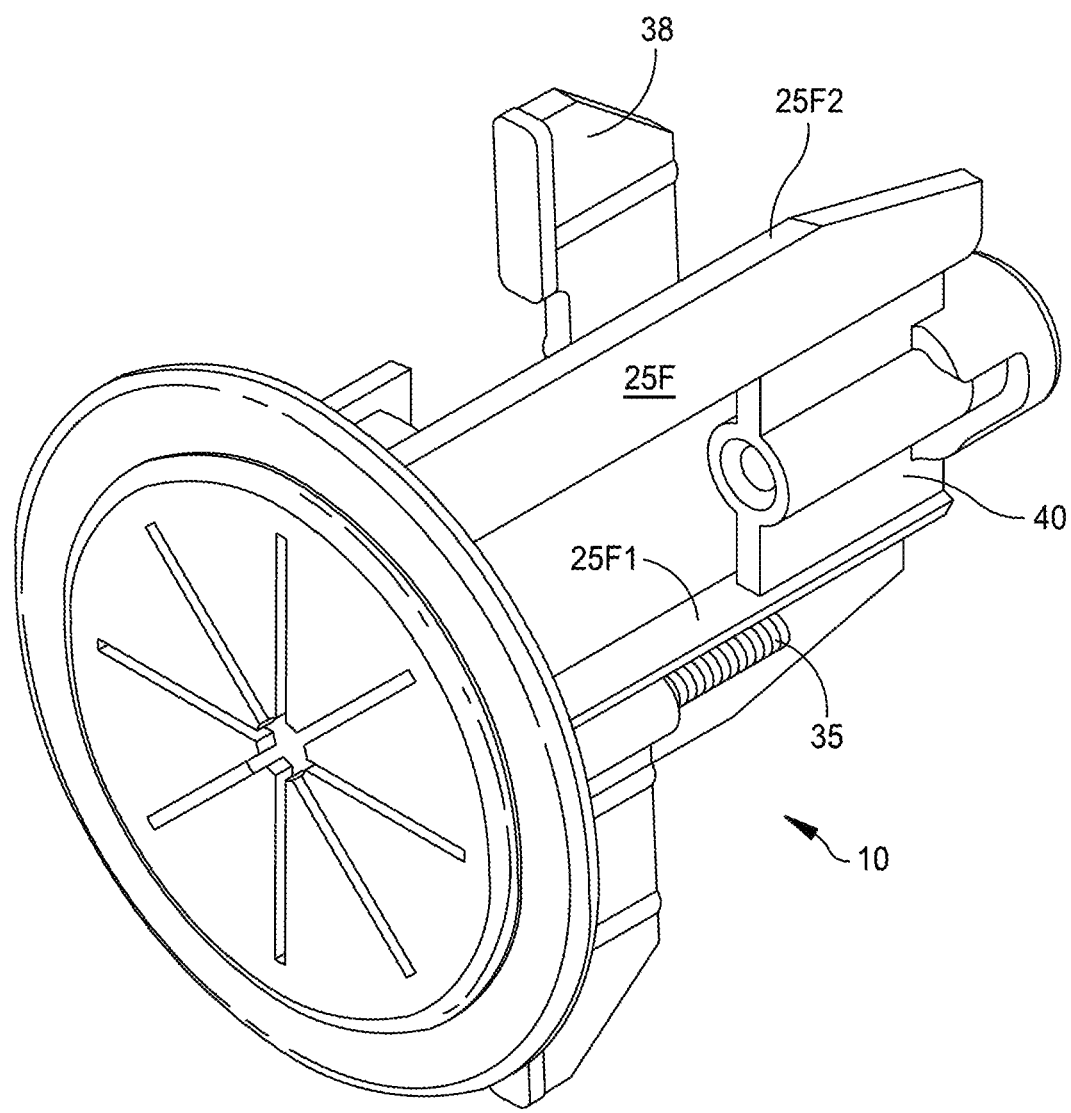

In Referring to FIG. 6 there is shown an embodiment of the present invention, a rapid mount wall anchoring system 10 with a rigid frame 25 and a load bearing plate insert 30. The rigid frame 25 can be installed without bearing plate insert 30, where plate insert 30 is separate and removable. In this embodiment the system 10 may be used for cable pass through only. The opening may also include any grommet type insert known in the art as illustrated in FIGS. 7 and 8. The rigid frame 25 includes a lip 25A having an opening 25B therein and an inner periphery 25C on the lip 25A surrounding the opening. Extending rearward from inner periphery 25C is a sidewall 25D extending to an outer periphery 25E. As illustrated in FIG. 4 and FIG. 6, the two guide members 25F are aligned opposite each other at 0 degrees and 180 degrees along cylindrical sidewall 25D and extend rearward from outer periphery 25E to their distal end 25G1. The circumference of the cylindrical sidewall 25D defines an arc range of 360 degrees.

In one embodiment, the two guide members 25F include mounting bosses 25G that include a face 25H including apertures therein (not shown) for the passage of threaded fasteners 35. The guide members 25F include a lip portion 25F1 extending from mounting bosses 25G through the length of guide members 25F. Referring to FIG. 4, each mounting boss 25G has a width W2 determining an associated arc range A, which is the distance that the width W2 extends along the cylindrical sidewall 25D. Each mounting boss 25G is integral to each respective guide member 25F. Clamp arms 38 have a width less than width W2. FIG. 4 is shown with degree markers along rigid frame 25 circular lip 25A illustrating 0, 11.25, 45, 90, 180, and 270 degree locations along the circular lip 25A.

Figure 1:
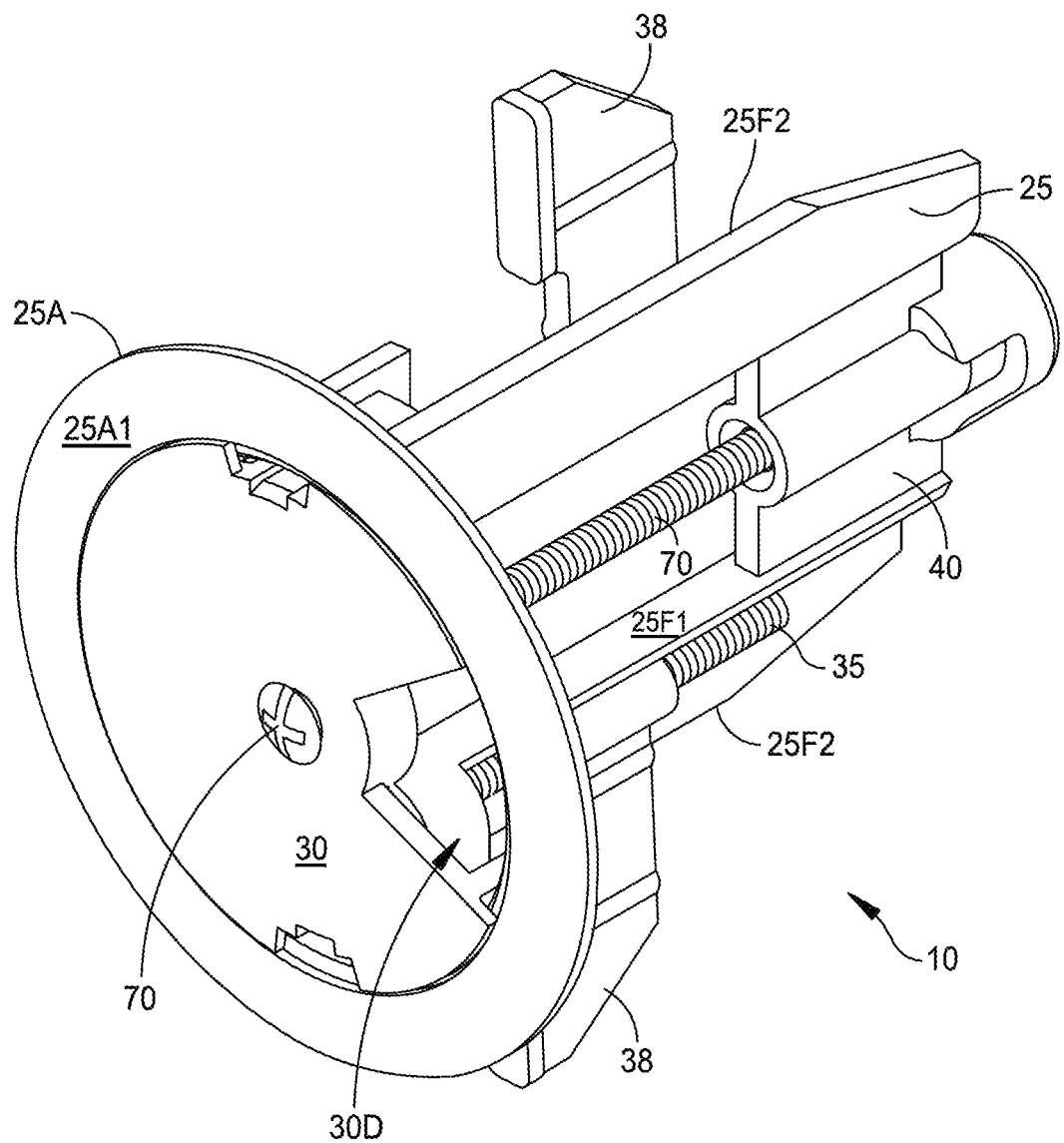
FIG. 1 is a front perspective view of the rapid mount wall anchoring system employing the principles of the present invention.
Figure 2:
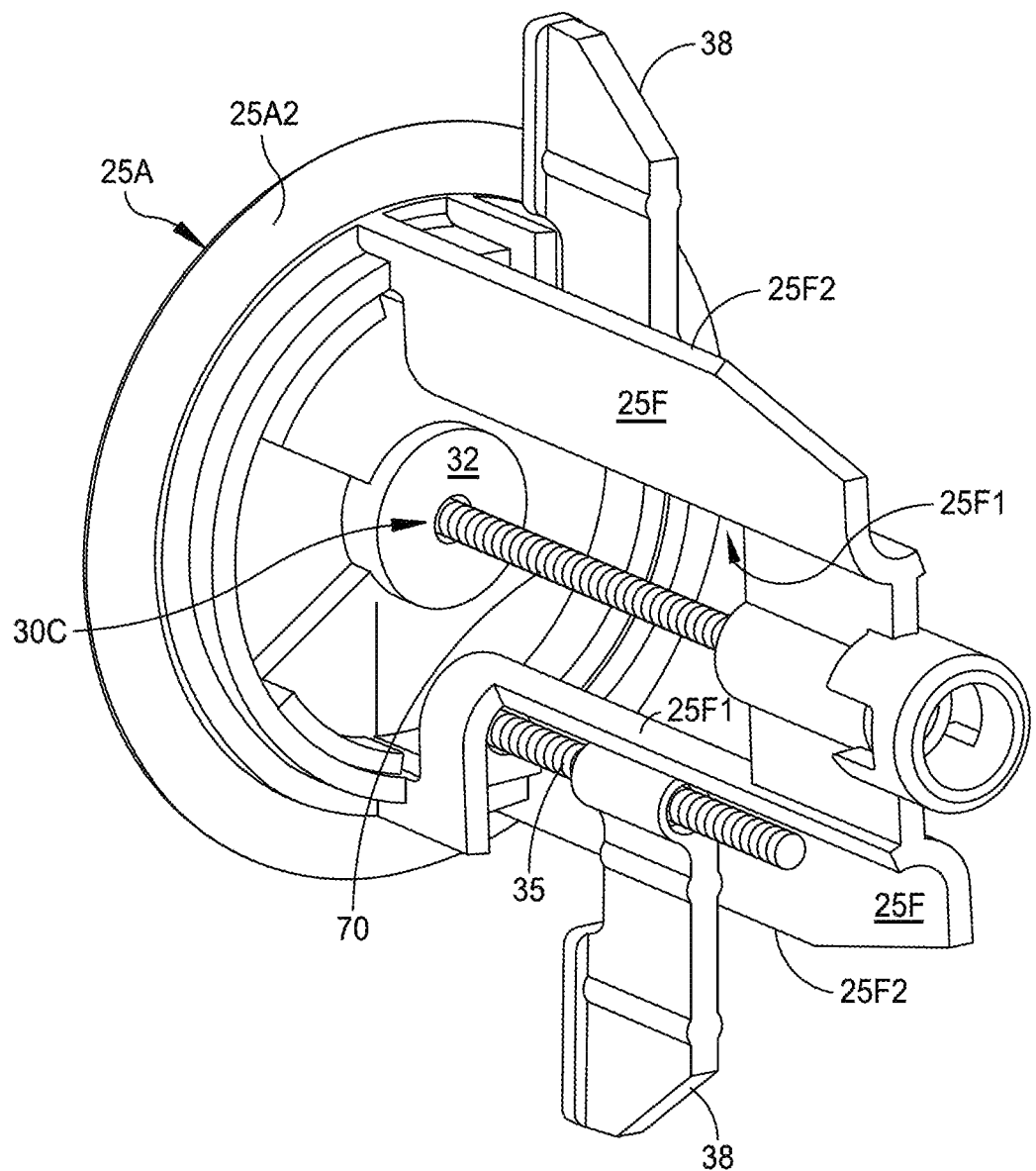
FIG. 2 is a rear perspective view of the rapid mount wall anchoring system of FIG. 1.
Figure 3:
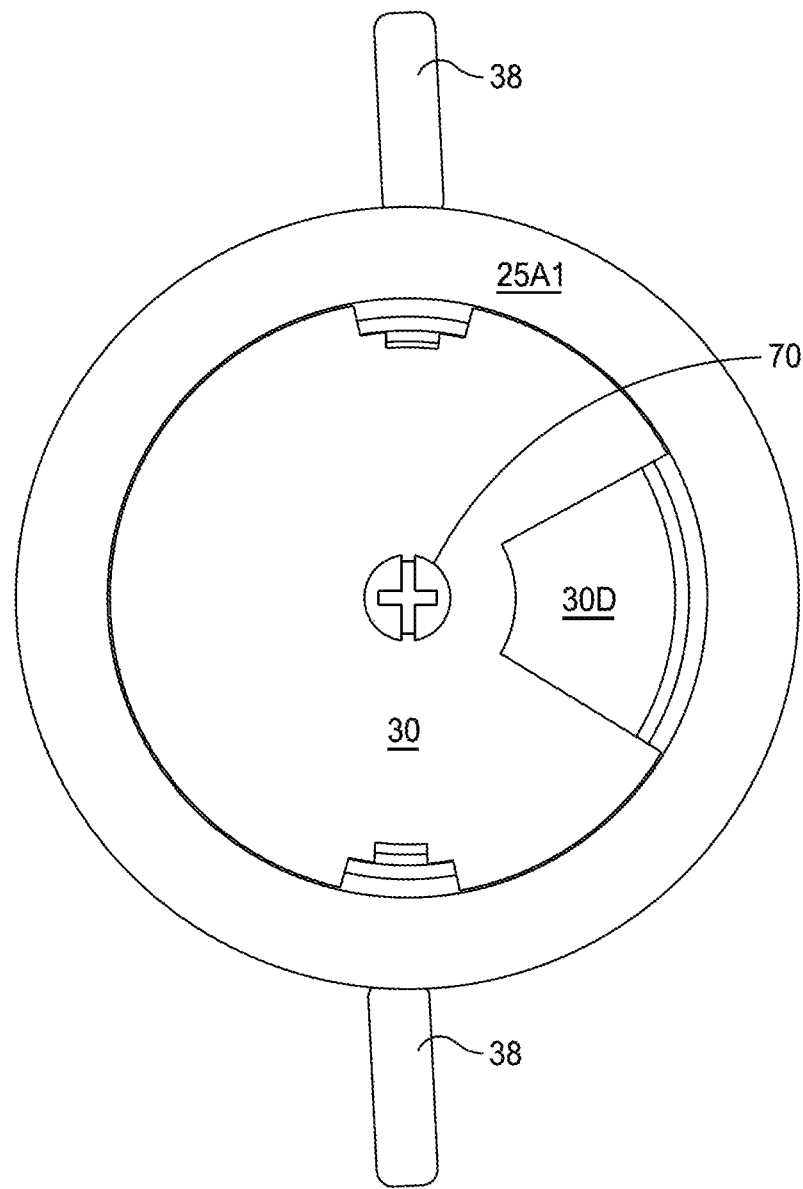
FIG. 3 is a top front view of the rapid mount wall anchoring system of FIG. 1.

Referring to FIG. 1 and FIG. 2, the lip 25A includes a front surface 25A1 and the faces 25H of the mounting bosses 25G are recessed away from the front surface 25A1 of the Lip 25A. Although two guide members are illustrated, a single guide member having a threaded bore arrangement in alignment with bore 30C of mounting boss 32 could be utilized with reduced load bearing characteristics. In another embodiment, the guide member and mounting arrangement may be a single element or arranged separately without departing from the spirit and scope of the invention.

Substantially long threaded fasteners 35, integral with guide members 25F, extend through mounting bosses 25G apertures and engage clamp arms 38. Clamp arms 38 include a threaded bore for engagement of threaded fasteners 35 to rotate clamp arms 38 between an extended position and retracted position as desired. The clamp arms 38 may also be rotated inward so they are confined within the perimeter of lip 25A when the wall anchoring system 10 is passed through a wall during installation. As illustrated in FIG. 2, the clamp arms, when in their normal position align vertically with Guide members 25F and cross member 40, allowing for a narrow "blade like" footprint when maneuvering wall anchoring system 10 through a wall.

Figure 9:
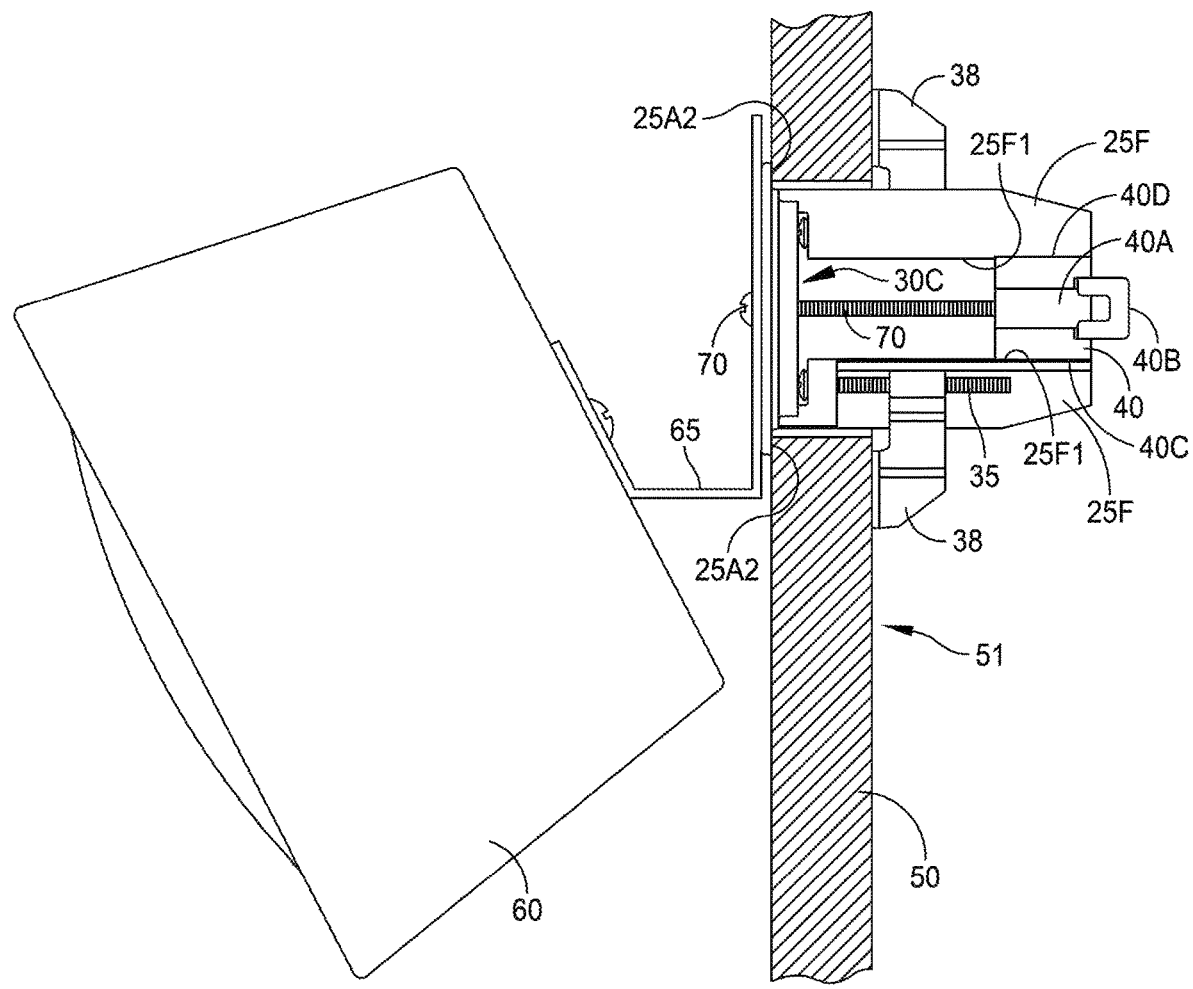
FIG. 9 illustrates the rapid mount wall anchoring system of FIG. 1, mounted to a wall.

Referring to FIGS. 2, 7 and 9, the wall anchoring system 10 can then be inserted into a circular hole in a wall, the hole having a diameter less than the diameter of lip 25A and preferably a diameter equal to the distance between guide member edges 25F2. This will allow for lip 25A rear surface 25A2 to engage the wall surface as illustrated in FIG. 9. The clamp arms 38 are then rotated outward and each threaded fastener 35 can be easily rotated within its aperture as desired by turning the head of the respective fastener 35 with an appropriate tool such as a screwdriver (not shown), causing the clamp arms 38 to pull rear surface 25A2 against wall 50 as clamp arms 38 are forced against the interior surface 51 of wall 50.

Referring to FIG. 6, and in one embodiment guide members 25F are situated 180 degrees apart along cylindrical sidewall 25D having at one end mounting bosses 25G and opposite ends 25G1 connected via cross member 40. Referring to FIGS. 4 and 6, Cross member 40 edge surfaces 40C and 40D are secured to upper lip portion 25F1 of guide members 25F. Lip portion 25F 1 provides a mounting position for cross-member 40 and provides isolation for clamp arms 38 and fasteners 35. Lip portion 25F1 is required to facilitate the integration of the "mounting arm" integral to the guide member and to provide a guide member with a narrow footprint to facilitate the maneuvering of the mounting system 25 between obstructions that may exist at the mounting location.

As illustrated in FIG. 4, in one embodiment the guide members 25F defined by the arc range of width W2 allow the structure to be easily maneuvered between obstructions that may exist at the mounting location. In alternative embodiments, the arc range of the guide members and cross member may deviate from the embodiment illustrated in FIG. 4, without deviating from the scope of this disclosure.

Cross member 40 includes a threaded bore 40A and wire hang 40B. Referring to FIG. 2 and FIG. 6, Load bearing plate insert 30 includes a circular sidewall 30A and a threaded bore 30C within mounting boss 32 that is positioned in alignment with threaded bore 40A. Threaded bores 30C and 40A accept threaded mounting fastener 70 for securement of devices to plate insert 30. Plate Insert 30 further includes connection means for securing plate insert 30 into opening 25B. In the preferred embodiment, the connection means are resiliently flexible tabs 30B having a lip 30B1 that engages outer periphery 25E locking plate insert 30 in place. When locked in place plate insert 30 circular sidewall 30A slideably engages sidewall 25D, allowing for plate 30 to be rotated to a limited degree up until lip 30B1 contacts mounting bosses 25G.

Plate insert 30 further includes an opening 30D for the passage of cables from an interior wall to a mounted device. In an alternative embodiment, without plate insert 30, cables can pass through opening 25B or through a grommet placed in opening 25B as illustrated in FIG. 8. As illustrated in FIG. 9, wall anchoring system 10 is shown installed within wall 50 for support and hanging of device 60. In the example, a brace 65 is screwed to anchoring system 10 by threaded mounting fastener 70 and the brace supports device 60. As illustrated in FIG. 9, threaded mounting fastener 70 engages plate 30 through threaded bore 30D and cross member 40 threaded bore 40A to support the load of device 60.

Although a separate brace 65 is illustrated any device mounting arrangement may be utilized for engagement with fastener 70, including direct mounting to fastener 70. The combination of clamp arms 38, load bearing plate 30, and cross member 40 allow for the hanging of devices of significant weight. The wall anchoring system 10 has been shown to support weights of at least 90 lbs for plates 30 being less than 2 inches in diameter. For ceiling installations cross member 40 includes a wirehang 40B that may be connected to a wire (not shown) secured on one end to an interior roof stud. The wall anchoring system 10 may be molded of various plastics including polycarbonate, polyvinyl chloride, acrylonitrilebutadience styrene, and polyethylene, as well as others known in the art for the intended application of supporting a load.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

I claim:

1. A wall anchoring system for securing objects to a wall, comprising:
   a rigid frame, comprising:
      at one end a lip extension, said lip extension having a closed perimeter defining a central opening, said lip extension having a front and rear surface, said lip extension further including a cylindrical sidewall, said cylindrical sidewall having a first end and a second end, the first end connected to the rear surface of said lip extension, the cylindrical sidewall extending away from said rear surface to said second end, said second end of said cylindrical sidewall defining a peripheral edge;
      first and second guide members each having a middle section extending between first and second ends, said first ends of said first and second guide members secured to said sidewall peripheral edge, said middle sections of said first and second guide members extending away from said cylindrical sidewall to said second ends of said first and second guide members respectively,
      a cross-member secured between said second ends of said first and second guide members;
      said first and second guide members opposite each other at 0 degrees and 180 degrees along said cylindrical sidewall, each of said first and second guide members having a width W2 with an arc range along said cylindrical sidewall of less than 25 degrees; and
      a mounting arrangement for securing said rigid frame to a wall.

2. A wall anchoring system for securing objects to a wall, as in claim 1 wherein said first and second guide members comprise opposing lip surfaces, said cross member secured between said opposing lip surfaces.

3. A wall anchoring system for securing objects to a wall, as in claim 2 wherein said mounting arrangement is integral to said first and second guide members, and wherein said mounting arrangement includes clamp arms, each clamp arm having a width less than said width W2.

4. A wall anchoring system for securing objects to a wall as in claim 3, wherein said mounting arrangement further includes:
   a first and second mounting boss integral with said first ends of said first and second guide members respectively, said first and second mounting boss positioned rearward from said lip extension front surface;
   a first and second threaded fastener in engagement with respective said first and second mounting boss; and
   each said clamp arm in engagement with a respective said first and second threaded fastener.

5. A wall anchoring system for securing objects to a wall, as in claim 1 wherein said cross member includes a first threaded bore, said first threaded bore in substantial alignment with said central opening.

6. A wall anchoring system for securing objects to a wall, as in claim 5 further including a fastener for securing said object to said frame, said fastener having a middle section extending between a first and second end, said fastener second end engaging said first threaded bore.

7. A wall anchoring system for securing objects to a wall, as in claim 6, further including a plate insert positioned within said central opening, said plate insert including a second threaded bore therein, said fastener first end engaging said second threaded bore of said plate insert.

8. A wall anchoring system for securing objects to a wall as in claim 7 wherein said plate insert includes an opening for cable pass through.

\* \* \* \* \*